United States Patent [19]

Nonaka et al.

[11] Patent Number: 5,373,635
[45] Date of Patent: Dec. 20, 1994

[54] METHOD OF MANUFACTURING A LINEAR MOTION GUIDE UNIT

[75] Inventors: Toshihiko Nonaka, Kamakura; Toshiaki Shimizu, Yokohama; Yukio Yoshioka, Kawaguchi, all of Japan

[73] Assignee: Nippon Thompson Co., Ltd., Tokyo, Japan

[21] Appl. No.: 147,610

[22] Filed: Nov. 4, 1993

Related U.S. Application Data

[62] Division of Ser. No. 973,096, Nov. 6, 1992, Pat. No. 5,267,796.

[30] Foreign Application Priority Data

Nov. 7, 1991 [JP]  Japan .................................. 3-318647

[51] Int. Cl.⁵ ...................... B23P 17/00; F16C 33/00
[52] U.S. Cl. ................... 29/898.1; 29/898.03; 29/527.5
[58] Field of Search ............ 29/898.02, 898.03, 898.1, 29/898.14, 898.15, 527.3, 527.5

[56] References Cited

U.S. PATENT DOCUMENTS

| | | | |
|---|---|---|---|
| 3,301,611 | 1/1967 | Dunlap . | |
| 3,621,733 | 11/1971 | Seulen et al. ...................... | 29/898.1 |
| 4,662,762 | 5/1987 | Schwarz ............................. | 384/25 |
| 4,682,899 | 7/1987 | Andersson et al. ................ | 384/41 |
| 4,797,011 | 1/1989 | Saeki et al. ........................ | 384/13 |
| 4,978,233 | 12/1990 | Stötzel et al. ...................... | 384/12 |
| 5,076,714 | 12/1991 | Terimachi ......................... | 29/898.03 X |
| 5,295,748 | 3/1994 | Yamazaki .......................... | 29/898.03 X |

FOREIGN PATENT DOCUMENTS 58-186541  10/1983  Japan .

*Primary Examiner*—Tom Hughes
*Attorney, Agent, or Firm*—Skjerven, Morrill, MacPherson, Franklin, & Friel

[57] ABSTRACT

A method of manufacturing a linear motion guide unit having a slider mounted to a rail. The rail includes a top surface, a bottom surface and a pair of side surfaces. A liner overlying the rail is press-formed against a core which is lager than a combination of the rail and a thin plate member. The press-formed liner is placed inside a mold and molten metal is poured into a gap formed between the liner and the mold. After the metal cools to a hardened condition, the slider is removed from the mold and assembled on the rail with a gap defined between the top of the rail and an opposed surface of the slider. Oil is supplied to the gap to define an oil film between the rail and the slider.

6 Claims, 10 Drawing Sheets

METHOD OF MANUFACTURING A LINEAR MOTION GUIDE UNIT

This application is a division of application Ser. No. 07/973,096, filed Nov. 6, 1992 now U.S. Pat. No. 5,267,796.

BACKGROUND OF THE INVENTION

1. Field of the Invention

This invention generally relates to a linear motion guide unit and its manufacturing method, and, in particular, to a linear motion guide unit having a vibration resistant mechanism and its method of manufacturing. More specifically, the present invention relates to an anti-vibration linear motion guide unit which is particularly suited for use in guiding a linear motion in machine tools, industrial robots or the like.

2. Description of the Prior Art

In processing or machining a work piece by machine tools, either one of the work piece or machine tools is held stationary and the other is caused to move, and a linear motion guide unit may be used in guiding a linear motion in such a case. The linear motion guide unit typically includes a rail extending straight over a desired length and a slider slidably mounted on the rail. The linear motion guide unit may be either of the rolling contact type or of the sliding contact type. In the former type, a plurality of rolling members, such as rollers or balls, are provided between the rail and the slider to thereby provide a rolling contact between the rail and the slider. On the other hand, in the latter case, a sliding member is provided between the rail and the slider to thereby provide a sliding contact therebetween. The sliding contact type linear motion guide unit is typically used for providing a damping or vibration resistant characteristic.

Such a linear motion guide unit has various applications including machine tools. One example of conventional machine tool applications is illustrated in FIGS. 11 through 13. As shown in FIGS. 11 and 12, in this particular machine tool application, a rail 53 is fixedly attached to a base 51 by means of bolts 52 and on the rail 53 are slidably mounted a pair of end sliders 55 and a center slider 56 located between the pair of end sliders 55. As will be made clear later, in this particular example, the pair of end sliders 55 are of the rolling contact type sliders and the center slider 56 is of the sliding contact type slider having an anti-vibration mechanism. All of these end and center sliders 55 and 56 are fixedly attached to a table 58 by means of bolts 59. As a result, the table 58 may move linearly back and forth along the rail 53 relative to the base 51 as indicated by a double arrow F.

As best shown in FIG. 12, the rail 53 has a pair of upper and lower guide surfaces 53a on each side thereof, which extend in parallel with the longitudinal axis of the rail 53. The rail 53 also has a bottom mounting surface 53b which sits on the top surface of the bed 51 and a top flat surface 53c. The rail 53 is provided with a plurality of mounting holes 53d at a predetermined pitch and each of the mounting holes 53d extends through the rail 53 from its flat top surface 53c to its bottom surface and has a stepped portion serving as a stopper for the head of the bolt 52. The stepped portion is so located that the head of the mounting bolt 52 is completely received in the mounting hole 53d so as not to interfere with any of the sliders 55 and 56.

As shown in FIG. 12, the end slider 55 is slidably mounted on the rail 53 in a straddling manner and provided with four endless circulating paths 55a, each including a load path section, a return path section and a pair of curved connecting path sections, each connecting the corresponding ends of the load and return path sections, as well known in the art. The load path section is defined by a pair of the guide surface 53a of the rail 53 and its oppositely located outer guide surface formed in the slider 55. A plurality of rolling members or rollers 60 in this example are provided in each of the four endless circulating paths 55a. Those rollers 60 which are located in the load path sections of the endless circulating paths 55a provide a rolling contact between the rail 53 and the slider 55.

FIG. 13, on the other hand, illustrates how the center slider 56 is slidably mounted on the rail 53. As shown, the center slider 56 is also slidably mounted on the rail 53 in a straddling manner with a small buffer gap $e_1$ provided between the rail 53 and the center slider 56. The buffer gap $e_1$ is filled with an oil supplied through a supply passage 56a so that a film of oil or grease 63, which serves to damp or absorb vibration occurring between the rail 53 and the slider 56, is defined in this buffer gap $e_1$. Thus, the center slider 56 is provided with a vibration resistant mechanism which includes the film of oil 63. As a result, when the table 58 moves back and forth relative to the base 51 in the direction indicated by the double arrow F, any vibration which may occur between the base 51 and the table 58 can be advantageously absorbed or damped so that the table 58 may move relative to the base 51 virtually without vibration.

In the structure shown in FIG. 11, the table 58 is fixedly mounted on the single center slider 56 and two end sliders 55. However, in another structure, the table 58 may be fixedly attached to another set of center and end blocks which are slidably mounted on a rail extending in parallel with the rail 53 and fixedly mounted on the base 51 commonly. In either structure, a work piece to be processed or machined (not shown) may be fixedly mounted on the table 58 temporarily and may be processed or machined while moving back and forth in the direction indicated by the double arrow F.

As described above, since the center slider 56 is provided with an anti-vibration mechanism, the table 58 may move relative to the base 51 without vibration. However, in the prior art structure shown in FIG. 13, when the oil 63 changes its characteristics after use for some time, for example, due to mechanical vibration, heat and/or aging, the oil 63 tends to leak away from the gap. Therefore, it is required to supply additional oil 63 from time to time or in the worst case constantly. In addition, the oil 63 is also supplied into the mounting hole 53d and some of the oil 63 may also leak through a clearance between the bolt 52 and the mounting hole 53d. Moreover, in the prior art structure shown in FIG. 13, difficulty was encountered in keeping a the buffer gap $e_1$ at an optimal value and also in distributing the oil 63 uniformly across the top surface 53c of the rail 53 since the oil was only supplied from the supply passage 56a.

SUMMARY OF THE INVENTION

In accordance with the present invention, there is provided a linear motion guide unit, including a rail extending over a length and having a top surface, a bottom surface and a pair of opposite side surfaces; a thin plate member fixedly attached to the top surface of said rail, said thin plate member being formed with a groove extending in a predetermined shape for storing therein a quantity of oil; and a slider slidably mounted on said rail, said slider having an inner surface opposite to said thin plate member to thereby define a predetermined gap therebetween in which a film of oil is formed.

In the preferred embodiment, the rail is formed with a plurality of mounting holes extending therethrough and located spaced apart from one another along the longitudinal axis of the rail, and the oil groove extends in a zigzag manner such that it runs around each of the mounting holes. Preferably, the thin plate member is comprised of a material having a low coefficient of friction. Use may be preferably made of an aluminum foil for the thin plate member.

In accordance with another aspect of the present invention, there is provide a method for manufacturing a linear motion guide unit, comprising the steps of: subjecting a liner to press forming against a core having a size larger than a combination of a rail and a thin plate member to be provided on top of the rail by a predetermined amount; placing said liner thus pressed inside a mold having a predetermined cavity shape; pouring a molten metal into a gap between said liner and said mold and having said molten metal hardened to define a slider; removing said slider from said mold and having said slider assembled on a rail to thereby define a desired buffer gap between a top surface of said rail and an opposed side surface of said slider; and supplying oil to said buffer gap to thereby define a film of oil between said rail and said slider.

Preferably, the rail includes a thin plate member at its top surface. The thin plate member is fixedly attached to the top surface of the rail and it is comprised of a material having a low coefficient of friction. The liner preferably includes a bronze mesh as buried in a resin material, such as PTFE.

It is therefore a primary object of the present invention to provide an improved linear motion guide unit and its manufacturing method.

Another object of the present invention is to provide a linear motion guide unit having an improved, reliable and long-lasting anti-vibration characteristic and its manufacturing method.

A further object of the present invention is to provide a vibration resistant linear motion guide unit excellent in performance, simple in structure and thus low at cost, and its manufacturing method.

Other objects, advantages and novel features of the present invention will become apparent from the following detailed description of the invention when considered in conjunction with the accompanying drawings.

DESCRIPTION OF THE PREFERRED EMBODIMENTS

Figure 1:
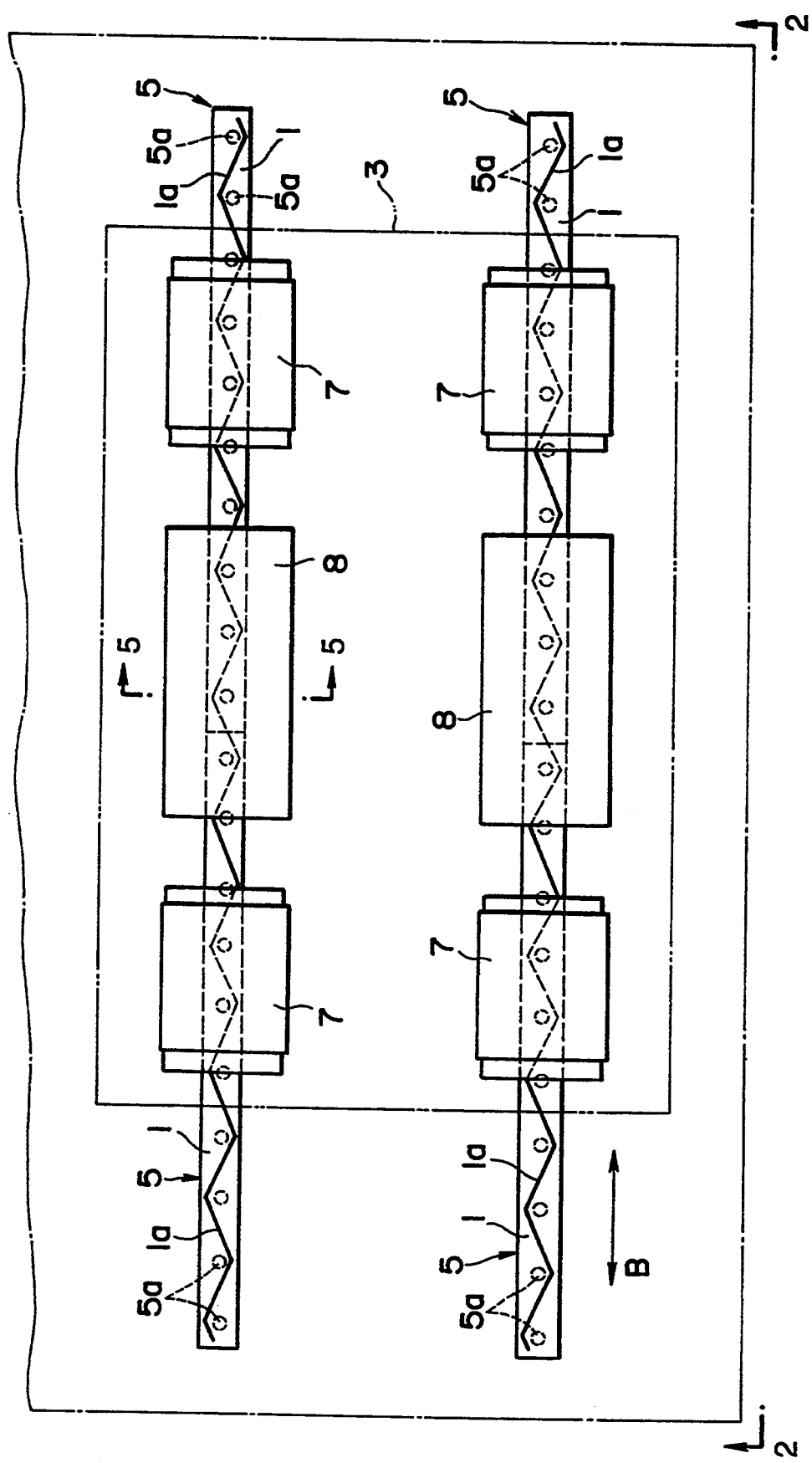
FIG. 1 is a schematic illustration showing in plan view a linear motion table assembly including a linear motion guide unit constructed in accordance with one embodiment of the present invention.
Figure 2:
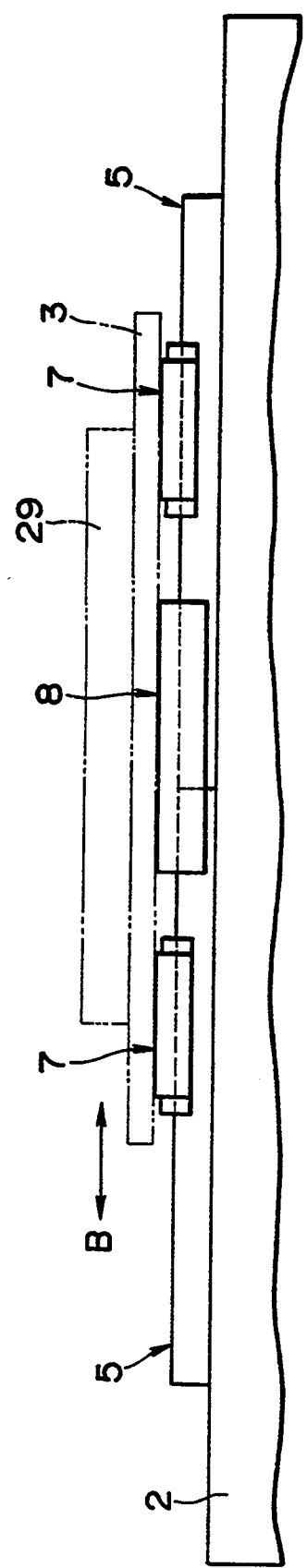
FIG. 2 is a schematic illustration showing in side elevation of the assembly shown in FIG. 1 when viewed in a direction indicated by 2—2 in FIG. 1.

Referring now to FIGS. 1 and 2, there is schematically shown a linear motion table assembly including a linear motion guide unit structure constructed in accordance with one embodiment of the present invention. This linear motion table assembly may be considered to define part of a machine tool. As shown, the present table assembly includes a pair of linear motion guide unit assemblies 1, each constructed in accordance with one embodiment of the present invention, which are fixedly mounted on a base 2 as spaced apart from each other over a predetermined distance and extending in parallel. Each of the linear motion guide unit assemblies 1 includes a rail 5, which is fixedly mounted on the base 2, and a set of sliders, including a pair of end sliders 7 and a center slider 8 located between the pair of end sliders 7.

Figure 3:
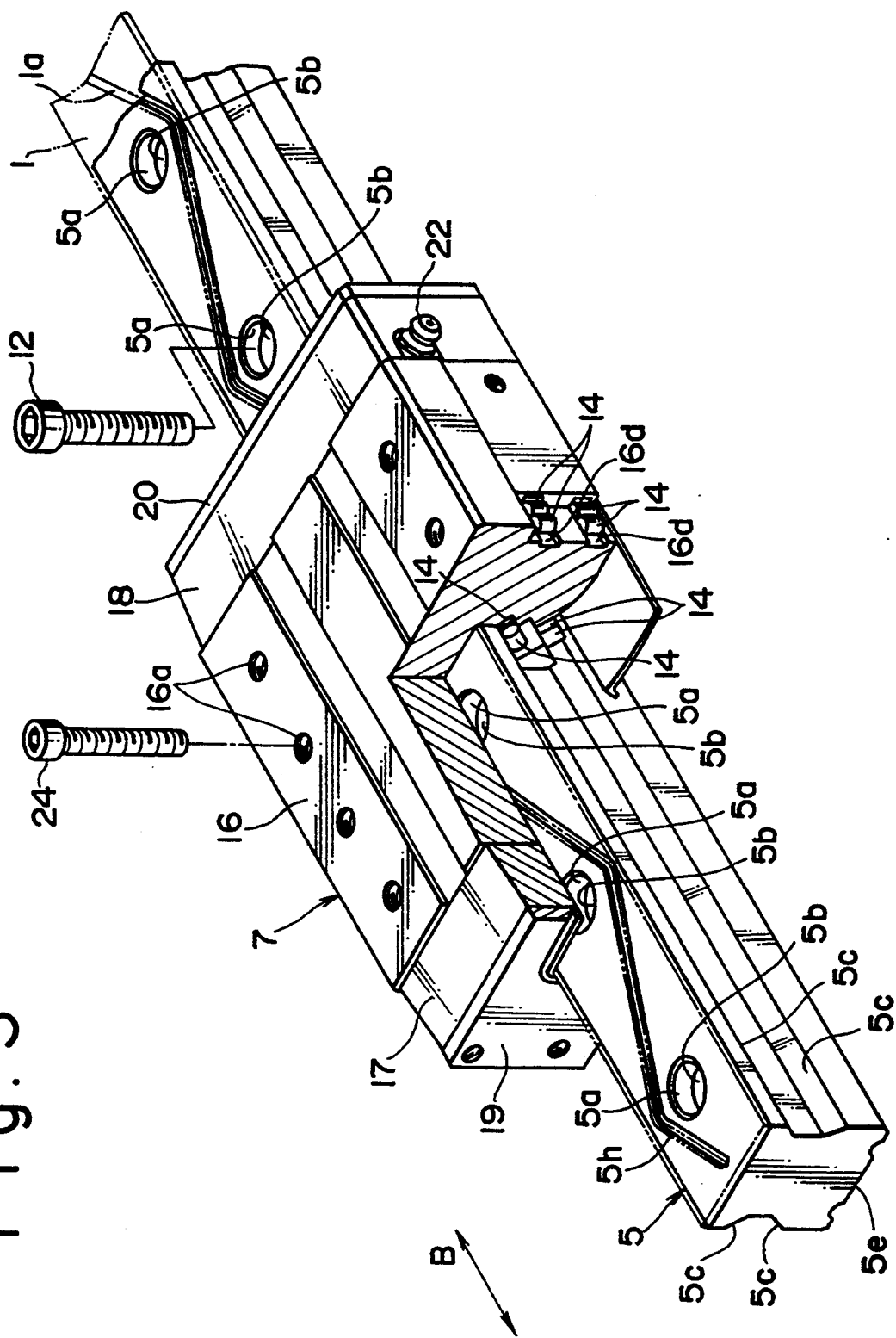
FIG. 3 is a schematic illustration showing in perspective view with its parts removed a linear motion guide unit including a rail and a rolling contact type slider constructed in accordance with one embodiment of the present invention as applied to the table assembly of FIG. 1.

As shown in FIG. 3, the rail 5 is formed with a plurality of mounting holes, each having a stepped portion for providing a seat for the head of a mounting bolt 12 at an interface between a larger diameter section 5a and a smaller diameter section 5b, spaced apart from one another along the longitudinal axis of the rail 5. The diameter of the larger diameter section 5a is larger than the diameter of the head of the mounting bolt 12, which in turn is larger than the diameter of the smaller diameter section 5b. Thus, the head of bolt 12 comes into engagement with the seat defined at the interface between the larger and smaller diameter sections 5a and 5b when the bolt 12 is tightened into a threaded hole provided in the base 2. The larger diameter section 5a has a depth which is deep enough to receive therein the entire head of the bolt 12 when tightened so that the head of the bolt 12 would not interfere with the movement of the end slider 7 which will be described in detail later.

The rail 5 has a pair of profiled side surfaces, each of which is provided with a centrally recessed section to thereby define a pair of oppositely inclined guide inner guide surfaces 5c extending in parallel with the longitudinal axis of the rail 5. The rail 5 also has a mounting surface 5e at its bottom so as to be fixedly mounted on the top surface of the base 2 and a flat top surface 5f. As is clear from FIG. 3, the end slider 7 is slidably mounted on the rail 5 in a straddling manner and it includes a horizontal section and a pair of vertical sections depending from the opposite sides of the horizontal section to thereby provide a generally U-shaped cross section. The end slider 7 is provided with four endless circulating paths, each including a load path section, a return path section 16d and a pair of curved connecting path sections, each connecting the corresponding ends of the load and return path sections, as well known in the art. Each of the endless circulating paths is provided with a plurality of rolling members or rollers 14 in the illustrated embodiment. The load path section is defined by an inner guide surface 5c of the rail and an outer guide surface located opposite to the inner guide surface 5c and formed at part of the end slider 7. Thus, those rollers 14 that are located in the load path section provide a rolling contact between the rail 5 and the end slider 7. In this embodiment, since the endless circulating paths are provided in the end slider 7, the end slider 7 may move along the rail 5 no matter how long the rail 5 extends.

In the illustrated embodiment, the end slider 7, which is a slider of the rolling contact type, includes three sections, i.e., a center block or casing 16 and a pair of front and rear end blocks 17 and 18 located at the opposite ends of the center block 16. End seals 19, 20 are fixedly attached to the front and rear end blocks 17 and 18, respectively. In this embodiment, the load and return path sections of each of the endless circulating path are provided in the center block 16 while the curved connecting path sections of the endless circulating path are provided in each of the end blocks 17, 18. The end block 18 is provided with a grease nipple through which grease may be supplied to each of the endless circulating paths. As also shown in FIG. 3, a plurality of threaded holes 16a are provided at the top surface of the center block 16 of the end slider 7, and the table 3 shown in FIGS. 1 and 2 may be fixedly attached to the slider 7 by having bolts 24 threaded into these threaded holes 16a.

Figure 4:
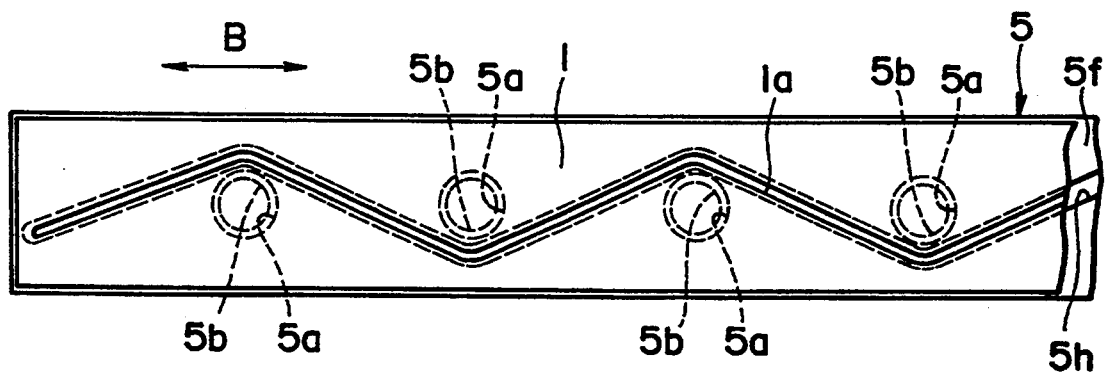
FIG. 4 is a schematic illustration showing in plan view the rail which forms part of the linear motion guide unit of FIG. 3.
Figure 5:
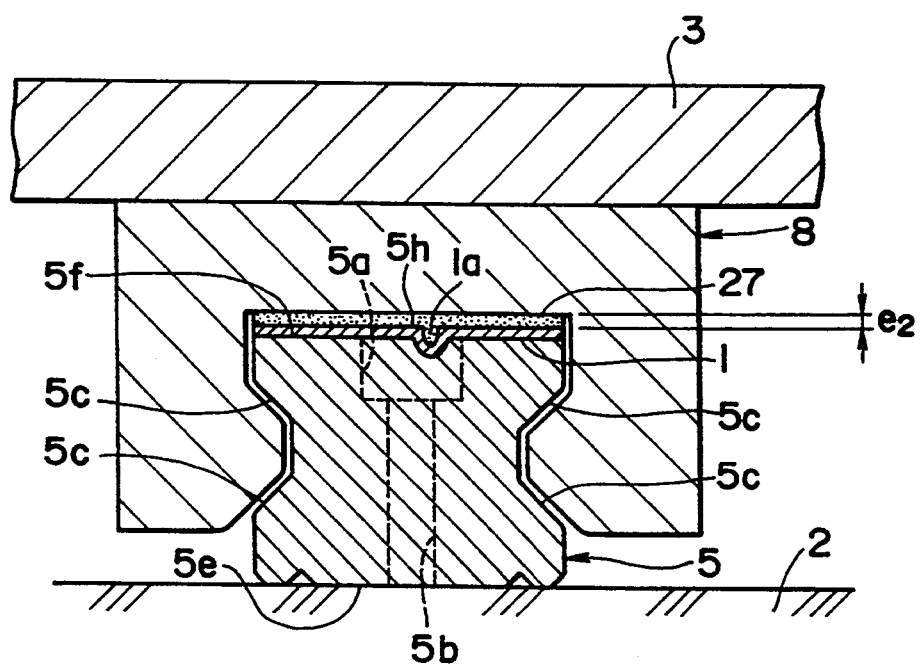
FIG. 5 is a schematic illustration showing in cross section taken at line 5—5 indicated in FIG. 1 a linear motion guide unit including the rail shown in FIG. 4 and a sliding contact type slider constructed in accordance with one embodiment of the present invention as applied to the table assembly of FIG. 1.

As shown in FIGS. 3 through 5, a thin plate member 1 having a rectangular shape corresponding substantially to the flat top surface 5f of the rail 5 is fixedly provided on the top surface 5f of the rail 5. The thin plate member 1 may, for example, be comprised of an aluminum foil and it may, for example, be fixedly adhered to the flat top surface 5f of the rail 5 by means of an adhesive or the like. As a result, the mounting holes 5a–5b formed in the rail 5 are all sealed by this thin plate member 1. In this respect, the thin plate member 1 is adhesively attached to the flat top surface 5f of the rail 5 after having the rail 5 fixedly mounted on the base 2 by means of mounting bolts 12.

Of importance, an oil groove 1a is formed at the surface of the thin plate member 1 extending across from one end to the other. In the illustrated embodiment, the oil groove 1a extends in a zigzag fashion running around each of the mounting holes 5a–5b. As will be described more in detail later, this oil groove 1a formed in the thin plate member 1 serves as a reservoir for keeping an amount of oil therein.

FIG. 5, which is a cross section taken at line 5—5 in FIG. 1, illustrates a center slider 8 constructed in accordance with one embodiment of the present invention as slidably mounted on the rail 5. The center slider 8 also has a generally U-shaped cross section and it is slidably mounted on the rail 5 in a straddling manner. The center slider 8 has an anti-vibration mechanism and there is rolling contact between the center slider 8 and the rail 5 in this embodiment, though a rolling contact may also be provided between the center slider 8 and the rail 5, if desired. As shown in FIG. 5, a buffer gap $e_2$ is defined between the top surface of the thin plate member 1 fixedly attached to the flat top surface 5f the rail 5 and an opposite flat surface of the center slider 8. This buffer gap $e_2$ is supplied with a quantity of oil to thereby define a film of oil 27 across the entire top surface of the thin plate member 1. This film of oil 27 serves as an anti-vibration mechanism for damping and/or absorbing any vibration so that any vibration is prevented from being transferred through this film of oil 27. Thus, it is important that the buffer gap $e_2$ be filled with an enough amount of oil at all times so as to provide a desired anti-vibration characteristic.

In the present invention, since the oil groove 1a is provided in the thin plate member 1, it is insured that a quantity of oil be always maintained in the buffer gap $e_2$. Therefore, even if the oil deteriorates and looses its viscosity to some degree because of application of mechanical vibration and/or heat and aging, the oil 27 is prevented from leaking away and can be maintained in the buffer gap $e_2$ for an extended period of time. As a result, a desired damping or vibration absorbing characteristic can be maintained at all times. In addition, since the oil groove 1a is in communication with the buffer gap $e_2$ at all times, the oil 27 may be supplied to the buffer gap e2 constantly because of the capillary action and therefore the oil 27 may be distributed uniformly across the entire gap $e_2$ at all times. Moreover, the supply of oil to the gap $e_2$ is extremely easy in the present structure since it is only necessary to supply oil 27 to the oil groove 1a at any desired location. The oil 27 will then be automatically distributed across the gap e2 uniformly.

As briefly described above and shown in FIGS. 1, 3 and 4, the oil groove 1a in the illustrated embodiment is bent in a zig-zag format such that it extends around the location where the mounting hole 5a–5b is provided in the rail 5. Thus, since the oil groove 1a extends from one end of the thin plate member 1 to its other end in this zig-zag format, the oil may be supplied across the entire surface of the thin plate member 1 uniformly. However, it is to be noted that the present invention should not be limited only to such a specific shape, and the oil groove 1a may take any other desired shape or format. As is clear from FIGS. 3 through 5, in the illustrated embodiment, the oil groove 1a is defined by causing the thin plate member 1 to be locally deformed according to a groove 5h formed at the top surface 5f of the rail 5. Alternatively, however, the oil groove 1a may also be defined by directly forming a groove in the thin plate member 1 itself without forming the groove 5h at the top surface 5f of the rail 5.

Alternatively, the thin plate member 1 may be comprised of a material having a low coefficient of friction, such as a synthetic resin material. In this instance, the oil groove 1a may be formed at the time of fabricating the thin plate member 1 by molding. With such a material having a low coefficient of friction, the resulting thin plate member 1 can provide a surface having an excellent sliding characteristic so that there can be provided a linear motion guide unit structure having an excellent sliding performance. On the other hand, even in the case where the thin plate member 1 may also be comprised of a metal, such as aluminum, as described above, it may also be fabricated by molding in the same manner as that for resin materials. Alternatively, in this case, it may also be fabricated by press forming and the resulting structure may be subjected to precision grinding to thereby provide an extremely smooth surface. As described above, the thin plate member 1 may be fabricated relatively simply and at low cost.

As shown in FIG. 2, in the present table assembly, a work piece 29 to be processed may be fixedly attached to the table 3 by any appropriate means, and while the table 3 carrying thereon the work piece 29 executes its reciprocating motion along a predetermined linear path as indicated by a double arrow B, any desired processing action, such as cutting, grinding or milling, may be applied to the work piece 29. During such processing operation, vibration may be applied to the table 3; however, such vibration may be advantageously absorbed or at least damped by the oil film 27 present between the rail 5 and the center slider 8.

Although the center slider 8 in the above-described embodiment is of the sliding contact type and it does not include a rolling contact structure, the center slider 8 may have a rolling contact structure wholly or partly. By the same token, although both of the end sliders 7 are of the rolling contact type, either one or both of these end sliders 7 may include a sliding contact structure wholly or partly. That is, the present invention may take any desired form as long as any one of the end and center sliders 7 and 8 has an anti-vibration mechanism at least partly. Although use has been made of rollers as rolling members in the above-described embodiment, use may also be made of any other type of rolling members, such as balls, if desired. In addition, although the center slider 8 in the above-described embodiment has an endless circulating path, the present invention should not be limited only to such endless circulating path and the present invention is equally applicable to the finite stroke type having no endless circulating path.

Figure 6:
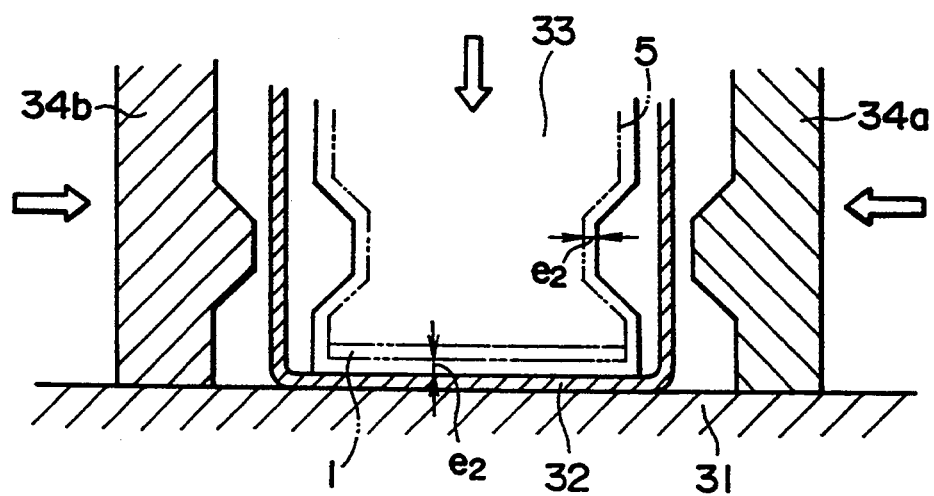
FIGS. 6 through 10 are schematic illustrations showing a sequence of steps for manufacturing a sliding type linear motion guide unit having an anti-vibration mechanism in accordance with a method of the present invention.
Figure 7:
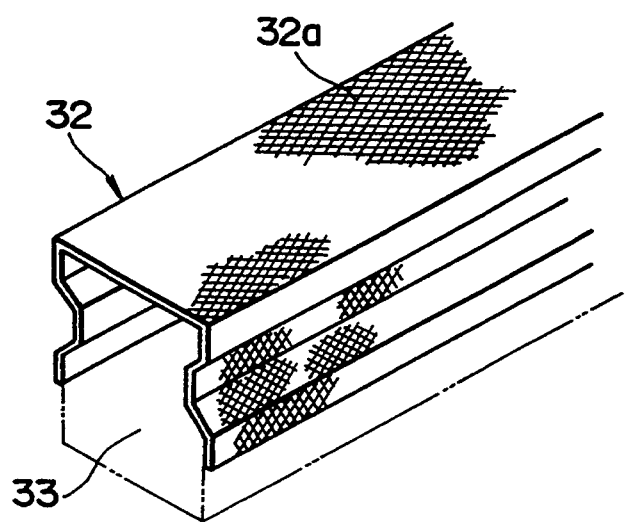
Figure 8:
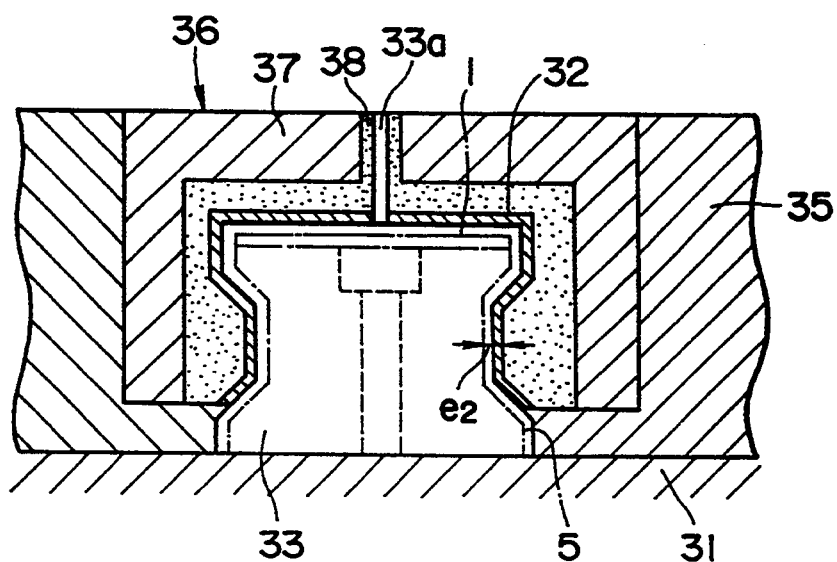

FIGS. 6 through 8 illustrate a linear motion guide unit constructed in accordance with another embodiment of the present invention and its manufacturing method. In this embodiment, a buffer gap $e_2$ is provided not only at the top surface of the rail 5 including the thin plate member 1, but also at each side surface of the rail 5. Thus, an oil film is formed all around the rail 5 uniformly in this embodiment. The linear motion guide unit of this embodiment is similar in structure to the above-described embodiment excepting the following differences, and, thus, no detailed explanation will be repeated for the similar components. In what follows, those elements which are similar to those in the previous embodiment will be designated by like numerals.

As shown in FIG. 6, a liner 32 before forming is placed on a base 31 and a core 33 having a shape similar to that of the rail 5 and having a size larger than a combination of the rail 5 and the thin plate member 1 by an amount of buffer gap $e_2$ is placed inside the liner 32. By providing the core 33 having a size larger than a combination of the rail 5 and the thin plate member 1 by such a predetermined amount in this manner, a clearance between the thin plate member 1 and its opposite inner surface of a slider 36 can be set at a desired value. The liner 32 has a main portion comprised of a resin material, and it is generally in the shape of a sheet and includes a net-shaped bronze mesh 32a provided on the outer surface of the resin main portion as buried therein, as shown in FIG. 7. And, the resin portion of the liner 32 is formed such that the side where the bronze mesh 32a is buried, i.e., the outer side, is thin. The resin material of liner 32 preferably includes a fluorine resin, such as PTFE, low in the coefficient of friction, excellent in wear and heat resistant characteristic, and high in load resistant characteristic as well as in thermal conductivity.

A pair of pressing units 34a and 34b similar in shape to the side surface of the core 33 is located on the opposite sides of the core 33 and the liner 32 as shown in FIG. 6. These pressing units 34a and 34b are brought closer together to thereby press the liner 32 against the core 33 so that the liner 32 is partly deformed in commensurate with the shape of the side surface of the core 33. The resulting liner 32 has a structure as shown in FIG. 7.

Then, the liner 32, together with the core 33, is placed inside a mold 35 having a two-part structure and located on the base 31. Then, a casing 37 having a generally U-shaped cross sectional shape is inserted into the mold 35 from above. The casing 37 is provided with a passage 38 through which a molten metal may be poured into a clearance between the liner 32 and the casing 37. When the molten metal hardens, the liner 32 and the casing 37 is integrated, thereby providing a sliding contact type slider 36. The core 33 is provided with a columnar projection 33a which loosely fits into the pouring passage 38, and, thus, when the projection 33a is removed, there is defined an oil supplying passage. The molten metal and the material forming the casing 37 may be zinc (melting temperature at 420 degrees C.), aluminum (melting temperature at 660 degrees C.), or the like. The molten metal thus poured will penetrate into the net structure of the bronze mesh 32a of the liner 32 so that the molten metal becomes physically integrated with the liner 32.

Thereafter, after cooling and hardening the molten metal, the mold halves are split open to remove the thus fabricated sliding contact type slider 36 and then the core 33 is removed from the slider 36. Then, the slider 36 is assembled on the rail 5 which is fixedly mounted on the base 31 and which has the thin plate member 1 fixedly attached at its top surface as indicated by the two-dotted lines in FIG. 8. When assembled in this manner, there is defined a desired buffer gap $e_2$ between the rail 5, including the top thin plate member 5, and its opposed inner surface of the casing 36 all around the rail 5.

Figure 9:
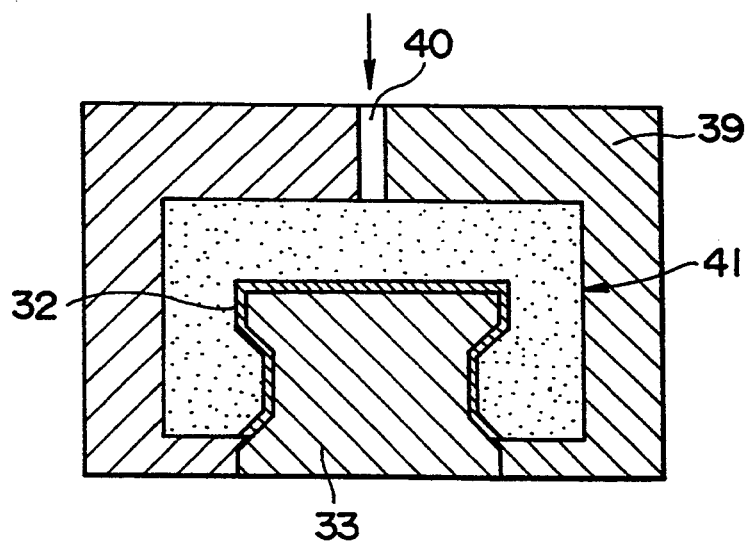
Figure 10:
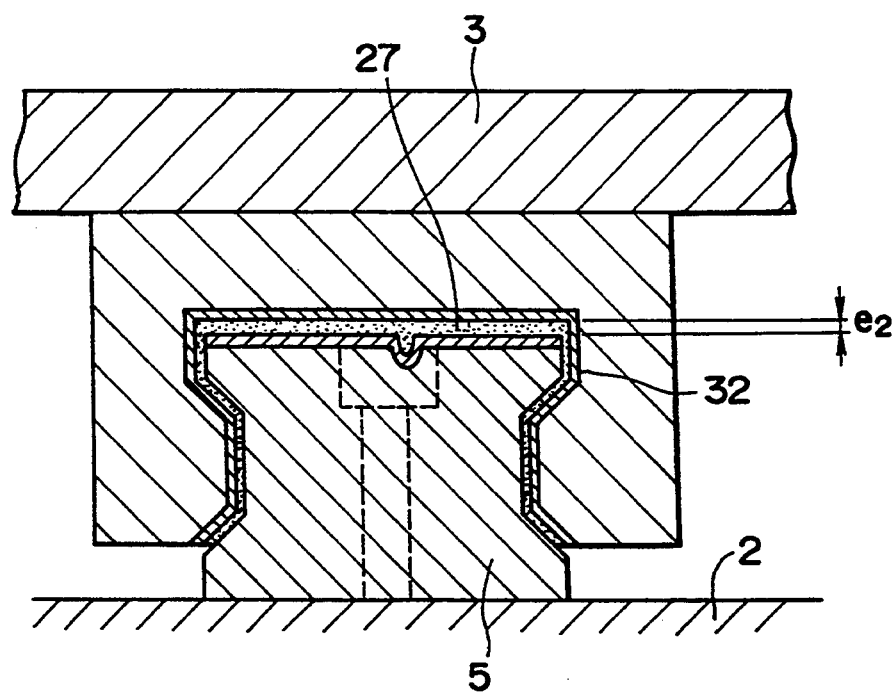
Figure 11:
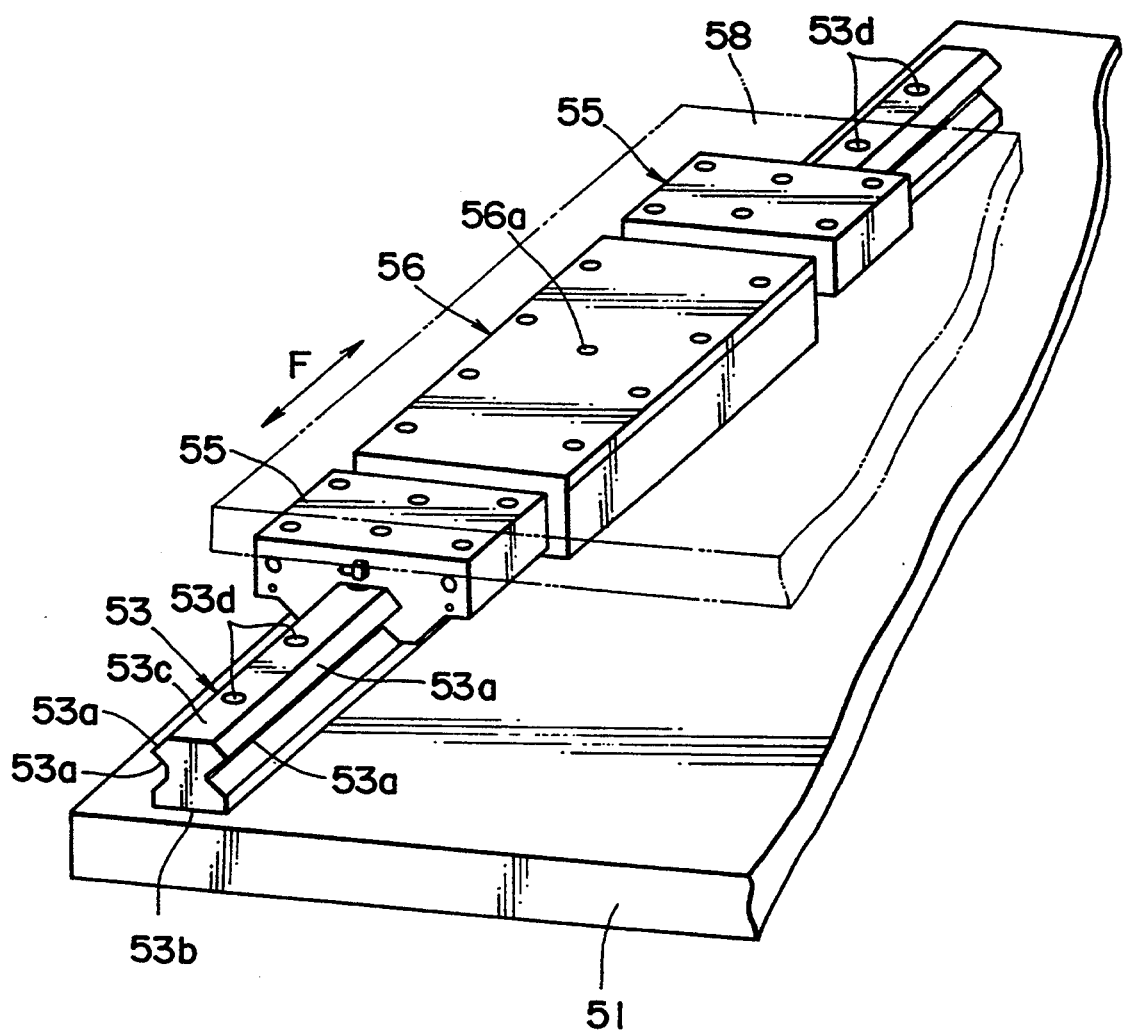
FIG. 11 is a schematic illustration showing in perspective view a typical prior art linear motion table assembly having a anti-vibration mechanism.
Figure 12:
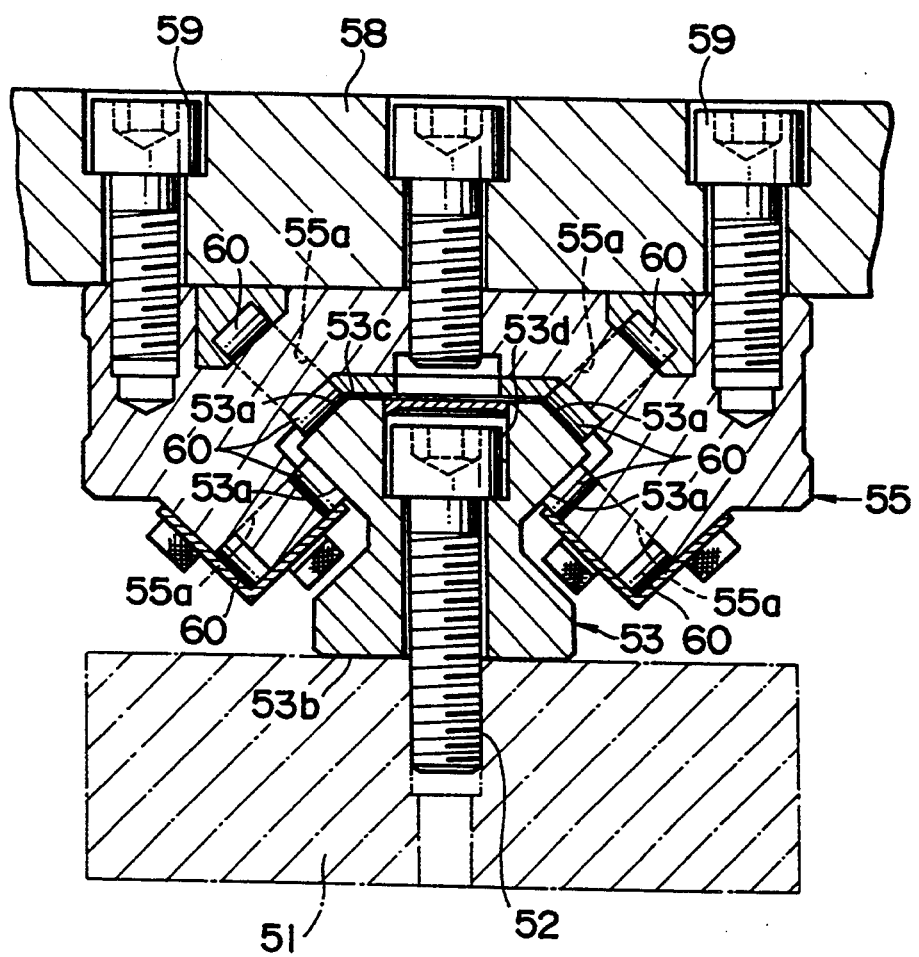
FIG. 12 is a schematic illustration showing in cross section a rolling contact type slider provided in the table assembly of FIG. 11.
Figure 13:
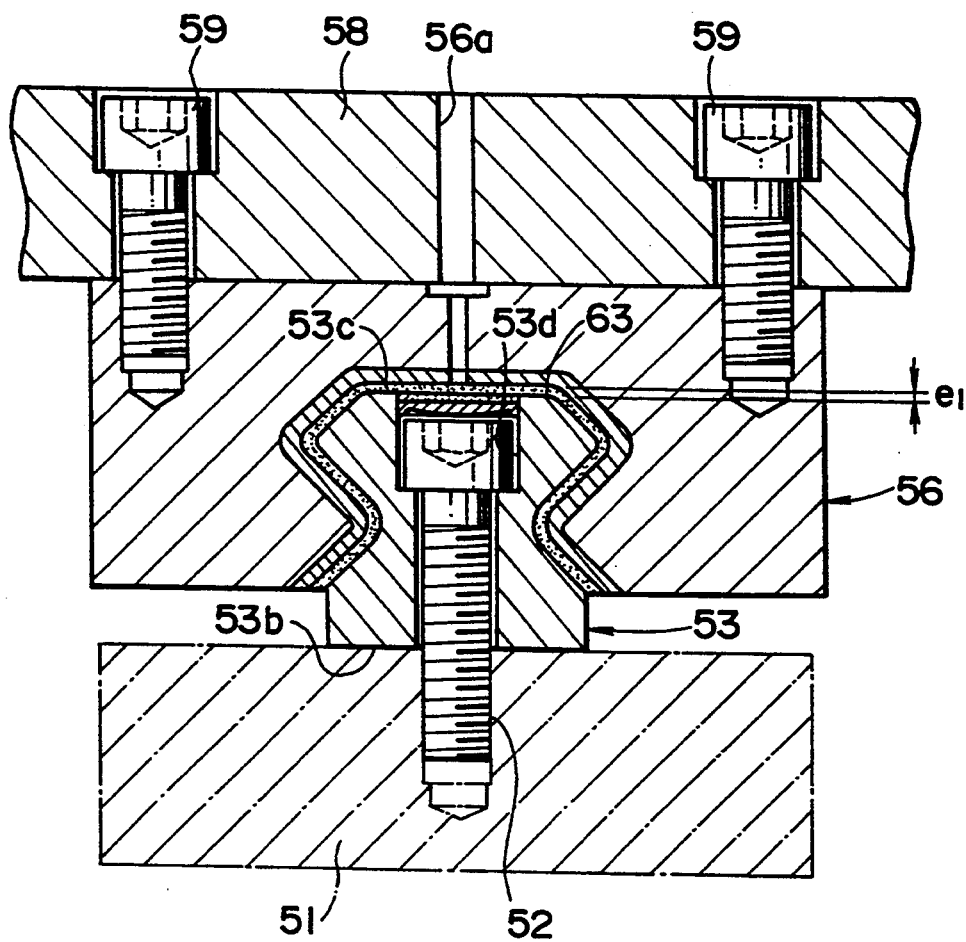
FIG. 13 is a schematic illustration showing in cross section a sliding contact type slider having an anti-vibration mechanism and provided in the table assembly of FIG. 11.

FIGS. 9 and 10 illustrate a linear motion guide unit constructed in accordance with a further embodiment of the present invention and its manufacturing method. Since this embodiment is similar in many respects to the second embodiment shown in FIGS. 6 through 8, it will be described as to those components which differ from the previous embodiment.

As shown in FIG. 9, the liner 32 having the structure shown in FIG. 7 is placed in a mold 39, together with the core 33. Then, a molten metal is poured into a space defined between the liner 32 and the mold 39 through a passage 40 provided in the mold 39. Therefore, there is obtained a slider 41 which is formed by a combination of the metal thus poured into and the liner 32 when the molten metal hardens. Then, the slider 41 thus molded is assembled on the rail 5 as shown in FIG. 10. Thus, a desired buffer gap $e_2$ is obtained between the rail 5, including the top thin plate member 1, and the slider 41, and a film of oil 27 may be provided in this buffer gap e₂. In this case also, an oil film 27 may be formed all around the rail 5 so that an excellent damping or vibration absorbing effect can be expected. In addition, since the liner 32 is comprised of a material having a low coefficient of friction, a relative sliding motion between the rail 5 and the slider 41 is extremely smooth.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for manufacturing a linear motion guide unit including a rail and a liner overlying the rail comprising the steps of:

press-forming the liner against a core having a size larger than a combination of the rail and a thin plate member to be provided on top of the rail by a predetermined amount;

placing said liner thus pressed inside a mold having a predetermined cavity shape; pouring a molten metal into a gap formed between said liner and said mold and cooling said molten metal into a hardened condition to define a slider;

removing said slider from said mold and assembling said slider on the rail to thereby define a desired buffer gap between a top surface of said rail and an opposed side surface of said slider; and supplying oil to said buffer gap to thereby define a film of oil between said rail and said slider.

2. The method of claim 1 including fixedly attaching a thin plate member to the top surface of said rail.

3. The method of claim 2, wherein said thin plate member is comprised of a material having a low coefficient of friction.

4. The method of claim 1, including burying a resin material into a bronze mesh to form said liner.

5. The method of claim 4, wherein said resin material includes PTFE.

6. The method of claim 1 further comprising forming a groove on an exposed surface of said plate member to provide a reservoir for the oil.

* * * * *